May 28, 1957     B. GOLDMAN     2,793,837
MIXING MACHINES
Filed June 8, 1954
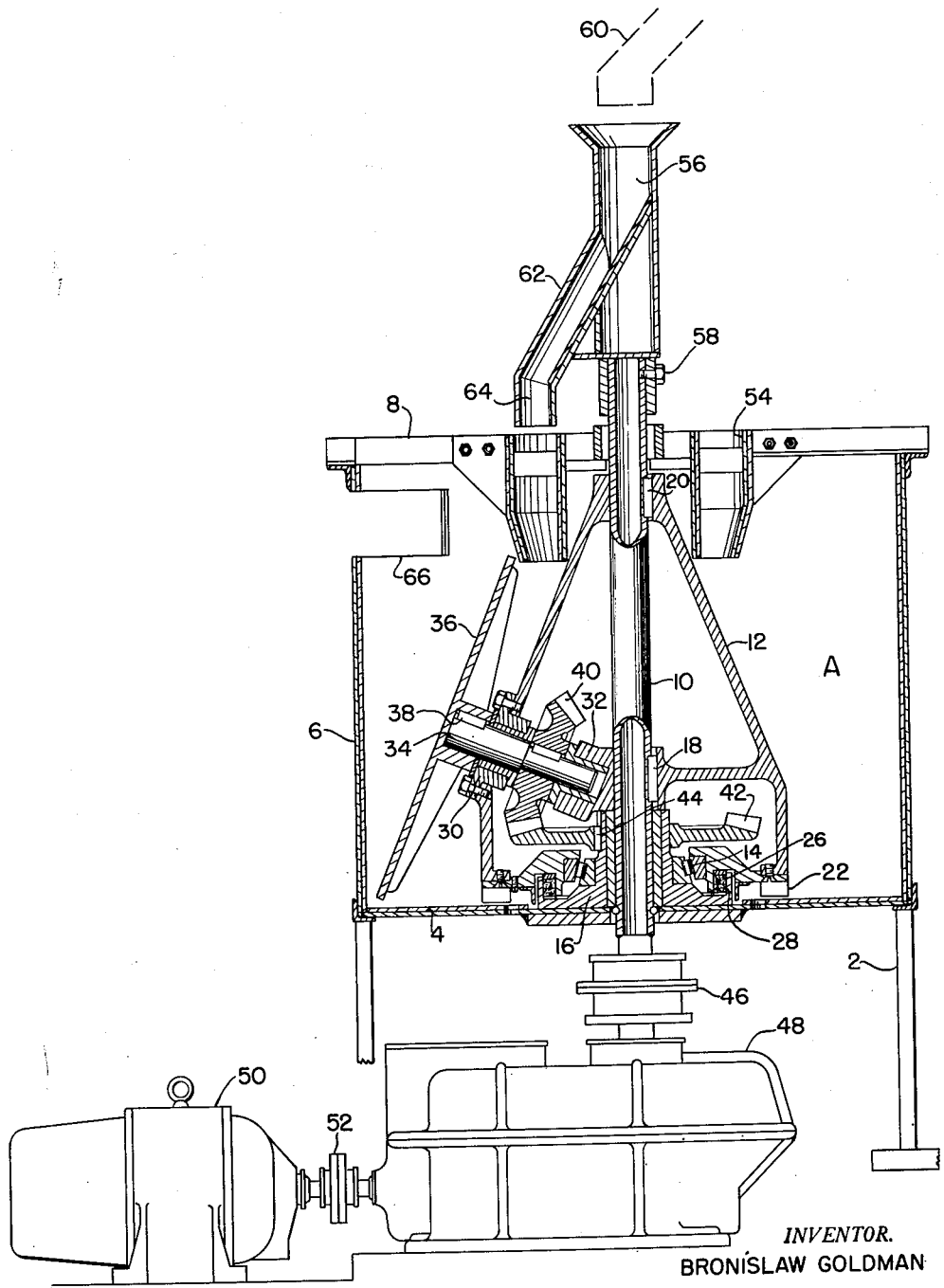
INVENTOR.
BRONISLAW GOLDMAN
BY Jaspert and Camby
Attorneys

United States Patent Office 2,793,837
Patented May 28, 1957

2,793,837
MIXING MACHINES

Bronislaw Goldman, Pittsburgh, Pa.

Application June 8, 1954, Serial No. 435,132

1 Claim. (Cl. 259—21)

This invention relates to new and useful improvements in mixing machines more particularly to mixing machines of the continuous type in which the material is fed continuously to the mixing container. It is among the objects of the invention to provide a mixing machine in which a revolving disc is rotated about a central axis in a cylindrical mixing chamber and the material is centrally charged behind the revolving disc and discharged adjacent the top of the chamber. It is another object of the invention to provide a feeder in which the mixing element is designed to co-act with the feeder in handling the material being charged and also move the material already in the cylinder primarily in a cycloid-like path to thoroughly mix the material and force it to be continuously discharged through or over the peripheral wall of the cylinder.

It is a further object of my invention to provide a materials feeding device which rotates with the mixing disc to charge the material through an annular hopper behind the disc while the latter moves in a circular path in the mixing chamber. The present invention is an improvement on the mixing machine disclosed in Patent No. 2,533,241 in that the mixing disc is designed to position the material and assist in the feeding and discharging of the material as in a continuous mixing apparatus, as well as to accomplish the mixing function of the previous patent.

These and other objects of my invention will become more apparent from a consideration of the accompanying drawings in which like reference characters designate like parts and in which:

The single figure is a vertical cross section of a continuous mixing device embodying the principles of this invention.

With reference to the drawing, the structure therein illustrated comprises an angle mounting base 2 supporting a mixing table 4 having a cylindrical housing 6 extending upwardly therefrom, which supports the top frame structure 8, the channel mounting, table, cylindrical housing, and top frame structure being stationary. A drive shaft or spindle 10 extends vertically, centrally of table 4 and drives a central gear housing 12 that is supported on thrust bearings 14 mounted on pedestal 16 which is stationary. The gear housing 12 is keyed to rotate with shaft 10 at 18 and 20 and is provided with scrapers 22 at the bottom thereof. Housing 12 is of conical or bell shape and provides a space A with cylindrical walls 6 for receiving the materials to be mixed. Thrust bearing 14 is sealed by packing 26 and the space between the housing 12 and the pedestal 16 is provided with a baffle consisting of an annular skirt angle 28.

Central housing 12 is provided with bearings 30 and 32 for receiving a shaft 34 on the end of which is mounted a mixing disc 36 which is keyed to the shaft at 38 and is provided with a bevel gear 40 that interacts with gear wheel 42 that is fixed on pedestal 16 by key 44. Shaft 10 is turned by coupling 46 through gear transmission 48 driven by motor 50 through coupling 52. Rotation of shaft 10 to which the housing 12 is attached will cause the bevel gear 40 to rotate by virtue of its tooth engagement with the fulcrum bevel gear 42 which is stationary. Rotation of bevel gear 40 causes disc 36 to revolve with shaft 34 while traveling through a circular path in the mixing chamber A.

Material to be mixed is continuously sent to the mixing chamber by means of the following apparatus. An annular hopper 54 open at the top and bottom, is supported on the top frame 8 and is stationary. A feeding hopper 56 is mounted on the shaft 10 to rotate therewith, being secured thereto by a screw bolt 58, the hopper being provided with a flared top that is in registry with the feeding chute 60. The feeding hopper is provided with a hollow arm 62 having a nozzle 64 in registry with the annular hopper 54, the nozzle 64 being in position to discharge the material through the annular hopper 54 directly behind the mixing disc 36 which, because of the mixing action, as will be hereinafter explained, provides a pocket behind the disc into which the material is charged. An opening 66 is provided in the cylindrical wall through which the material discharges after it is mixed.

The operation of the above apparatus will be described in connection with its use for mixing ore fines, coke breeze, lime and other material employed in sintering ores for use in blast furnaces and the like.

Successful sintering is dependent upon a thorough mixing of the batch materials, which is accomplished by the present equipment in a minimum of time.

The batch material is fed through chute 60 into a revolving hopper 56 and is spread through the stationary annular hopper 54 by the bottom arm 62 through nozzle 64. As the disc 36 rotates and travels in a circular path through the mixing chamber A, the charged materials will be thoroughly mixed by disc 36 acting to displace them primarily in a cycloid-like path from the bottom to the top of the machine.

The front of the disc 36 facing the cylindrical wall of the mixing chamber will always be loaded and fully charged with material while the back of the disc will be relatively free of material to provide a pocket into which the batch material is continuously charged by the revolving hopper arm 62.

As the mixed materials accumulate at the top of the mixing chamber, they will be discharged through openings 66 onto a conveyor belt or into a chute as the case may be.

The above described apparatus is capable of handling dry or wet materials and the materials charged into the mixing device are usually weighed and pre-mixed to some degree by gathering them from bins or other sources of supply. In the case of mixing batch material for sintering, some of the materials may be dry and other materials may contain some substantial amounts of mechanical moisture which does not impair the mixing action as effected by the mixing disc.

It has been determined by actual test that the mixing of batch material for sintering by means of the above-described apparatus utilizes about 90% of the total capacity of the mixing chamber even at low speeds as compared to the old pug mill type mixer of conventional use which utilizes only about 50% of the total capacity of the mixing chamber even at high speeds when both machines are mixing at a rate of about 10,000 pounds in two and one-half minutes.

I claim:

A mixing device comprising a cylindrical container with a bottom plate, a bell shape housing mounted centrally of said container and spaced from the walls thereof to form an annular mixing chamber, a disc mounted on a shaft journaled in said bell shape housing having its axis inclined from the central axis of the cylindrical container whereby the face of the disc extends from the upper region of the bell shape housing toward the angle between the cylindrical wall and the bottom plate of the container across the annular mixing chamber, means for rotating the bell shape housing and thereby revolve said disc to subject material in the mixing chamber to a mixing action, means for continuously feeding material behind the mixing disc comprising a fixed annular hopper having its discharge opening behind said disc, and a feed spout mounted for rotation with said bell shape housing having a feed nozzle in register with said annular hopper and in alignment with the axis of the disc whereby upon rotation of the disc and feeding spout, the material to be mixed will be continuously charged in the pocket formed by the mixing action of the revolving disc.

References Cited in the file of this patent
UNITED STATES PATENTS

| | | |
|---|---|---|
| 1,741,176 | Wilder | Dec. 31, 1929 |
| 2,088,551 | Geldhof | July 27, 1937 |
| 2,533,241 | Goldman | Dec. 12, 1950 |